United States Patent [19]

Serlin et al.

[11] 4,377,656

[45] Mar. 22, 1983

[54] COATING COMPOSITIONS COMPRISING ALLYLIC ALCOHOL INTERPOLYMERS

[75] Inventors: Irving Serlin; Donald M. Gardner, both of Springfield, Mass.

[73] Assignee: Monsanto Company, St. Louis, Mo.

[21] Appl. No.: 266,543

[22] Filed: May 22, 1981

[51] Int. Cl.³ .................... C08K 3/26; C08K 3/10; C08L 25/06; B32B 5/16

[52] U.S. Cl. .................... 524/413; 524/420; 524/423; 524/425; 524/432; 524/445; 524/448; 524/451; 524/503; 524/515; 524/523; 524/524; 525/57; 428/323; 428/331; 428/514

[58] Field of Search .................... 260/42.22, 42.52; 526/326; 525/57; 524/425, 503, 413, 420, 423, 432, 445, 448, 451, 515, 523, 524

[56] References Cited

U.S. PATENT DOCUMENTS

| | | | |
|---|---|---|---|
| 2,940,946 | 6/1960 | Shokal et al. | 260/23 |
| 3,245,786 | 4/1966 | Cassiers et al. | 96/1 |
| 3,551,368 | 12/1970 | Sahni et al. | 260/42.22 |
| 3,577,374 | 5/1971 | Isaksen | 260/23 |
| 3,759,744 | 9/1973 | Schliesman | 117/218 |
| 4,046,941 | 9/1977 | Salto et al. | 428/323 |
| 4,130,670 | 9/1976 | Gilliams et al. | 428/353 |
| 4,165,308 | 8/1979 | Serlin | 525/222 |
| 4,167,602 | 9/1979 | Serlin | 428/240 |
| 4,239,858 | 12/1980 | Serlin | 260/33.6 UA |
| 4,259,425 | 3/1981 | Serlin | 525/60 |
| 4,278,782 | 7/1981 | Heaps et al. | 526/326 |

*Primary Examiner*—Paul Lieberman
*Assistant Examiner*—Herbert J. Lilling
*Attorney, Agent, or Firm*—R. Bruce Blance; William J. Farrington; Paul D. Matukaitis

[57] ABSTRACT

A coating composition comprising an intimate blend of a polymeric binder and from about 200 to about 1000 parts of an inert finely divided pigment per 100 parts by weight of polymeric binder. The binder contains a major proportion of a low molecular weight interpolymer comprising a monovinyl aromatic monomer, a $C_3$-$C_7$ allylic alcohol and optionally a monocarboxylic acid ester of a $C_3$-$C_7$ allylic alcohol, and a minor proportion of high molecular weight interpolymer. The coating composition is useful in the preparation of electrographic recording materials.

15 Claims, No Drawings

COATING COMPOSITIONS COMPRISING ALLYLIC ALCOHOL INTERPOLYMERS

This invention relates to a coating composition adapted for use in the preparation of electrographic recording materials.

In general, electrographic recording processes involve forming a latent image upon an electrically insulating charge-retentive layer of an electrographic recording material by impressing an electric charge corresponding to an original pattern and treating or developing the latent image by applying to the charge-retentive layer a colored resinous powder or toner which clings to the charged areas but which does not adhere to the uncharged areas. The developed image is then fixed by application of heat and/or pressure to the electrographic recording material to fuse the toner particles to the charge retentive layer and form a permanent visible image. The electrographic recording material comprises an electroconductive sheet support coated with the electrically insulating charge-retentive layer comprising an electrically insulating polymeric binder and optionally a pigment or filler. The coating is conventionally applied to the electroconductive sheet support as a dispersion of pigment in an organic solvent solution of the electrically insulating binder. In general the binder is an insulating resin of at least moderately high molecular weight, commonly selected from the group consisting of polyethylene, polyvinyl acetal, silicone resin, vinyl acetate copolymers, acrylate copolymers, and styrene-acrylate copolymers. The binder forms a substantially continuous film on the electroconductive sheet support when the organic solvent is evaporated from the solution. However, because of the high molecular weight of the binder resin, the solution is diluted with a considerable volume of solvent to provide a viscosity suitable for smooth and continuous coating.

According to the present invention, there is provided a coating composition comprising an intimate blend of a polymeric binder and from about 200 to about 1000 parts by weight of an inert finely divided pigment per 100 parts by weight of polymeric binder. The polymeric binder comprises a major proportion of a low molecular weight interpolymer comprising interpolymerized monovinyl aromatic monomer, a $C_3$-$C_7$ allylic alcohol and optionally an ester of a $C_3$-$C_7$ allylic alcohol and a monovalent carboxylic acid, of number average molecular weight in the range of about 700 to about 5000 and glass transition temperature at least about 30° C., and a minor proportion of a high molecular weight interpolymer. We have discovered that these coating compositions may be applied as high solids dispersions to an electroconductive sheet support to form an electrographic recording material. The dispersions can contain as little as 10 weight percent of solvent and can thus reduce solvent demand, conserve energy required to evaporate the solvent from the coating and decrease the amount of solvent effluent discharged into the air when the coating is dried, without sacrifice in the performance of the electrographic recording material produced therefrom.

The monovinyl aromatic monomer of the low molecular weight interpolymer can be selected from among the large group of aromatic monomers which contain a vinyl group directly attached to an aromatic nucleus. The aromatic nucleus may be substituted or unsubstituted so long as the unsaturation of the vinyl group is not hindered as in alphamethyl styrene. Among the substituents which may appear on the aromatic nucleus there may be mentioned lower alkyls such as methyl and ethyl, halogen such as chlorine, and the like. The nature of the aromatic nucleus is unimportant since it does not affect the interpolymerization reaction. Representative vinyl aromatic compounds include styrene, p-methylstyrene, o-methylstyrene, m-methylstyrene, 2,4-dimethylstyrene, p-chlorostyrene, p-ethylstyrene, beta-vinylnaphthalene and the like. The preferred species of vinyl aromatic is styrene.

The $C_3$-$C_7$ allylic alcohol component of the low molecular weight interpolymer can be selected from the group represented by the formula:

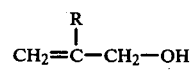

wherein R is hydrogen or a $C_1$-$C_4$ alkyl radical such as methyl, ethyl, propyl or n-butyl. The preferred allylic alcohol is allyl alcohol in which R is hydrogen.

The allylic ester component of the low molecular weight interpolymer is the ester of any of the above group of allylic alcohols and a monocarboxylic acid. Suitable acids include $C_1$-$C_{18}$ aliphatic carboxylic acids and $C_7$-$C_{14}$ aromatic acids. Examples of such acids include formic acid, acetic acid, propionic acid, lauric acid, oleic acid, stearic acid, benzoic acid, o-, m- and p-toluic acids, o-, m- and p-chlorobenzoic acids, o-, m- and p-nitrobenzoic acids, o-, m- and p-hydroxybenzoic acids and 1- and 2-naphthalic acids. The preferred allylic esters include allyl benzoate, allyl toluate, methallyl benzoate and methallyl toluate. An especially preferred allylic ester is allyl benzoate since it is prepared from readily available raw materials namely, allyl alcohol and benzoic acid.

The low molecular weight interpolymer can be prepared by interpolymerizing a mixture of the monomers by free radical methods at temperatures ranging from about 100° C. to above 250° C. in the presence of from 0.1 to 25% by weight of a peroxide or azo initiator having a decomposition temperature in excess of 90° C., the quantity of initiator being based on the weight and molecular weight of the interpolymer to be produced. The mixture of monomers selected to provide the desired ratio of monomers in the interpolymer is maintained in a mole ratio of monovinyl aromatic monomer to the sum of allylic alcohol and allylic ester from about 1:10 to about 1:100 by incremental addition of monovinyl aromatic monomer. The great disparity in concentration of monovinyl aromatic monomer and allylic monomers throughout the polymerization is dictated by the great disparity in reactivity ratios. However, the ratio of allylic alcohol to allylic ester is similar to the ratio desired in the final interpolymer because their reactivities are essentially similar.

The low molecular weight interpolymer is conveniently prepared by the methods set forth in U.S. Pat. Nos. 2,940,946 and 4,262,099, wherein polymerization is accompanied by programmed addition of the monovinyl aromatic monomer to maintain the relative concentrations of the monomers fairly constant although considerable latitude in the ratios is permitted without upsetting the desired ratio of monomers in the polymer. A uniform distribution of the allylic hydroxyl groups among the polymer molecules provides compatibility with organic solvents, polymers and reactants.

The number average molecular weight of the interpolymer is in the range of about 700 to about 5000 and is preferably in the range of about 900 to about 1800.

In general the low molecular weight interpolymer should contain at least about 40 weight percent of monovinyl aromatic monomer to allow the molecular weight to meet the minimum limit. When the monovinyl aromatic monomer content is less than about 40 weight percent, the molecular weight of the polymer is usually less than the desired minimum because of the excessive chain transfer activity of the allylic monomers and the need to use excessive amounts of initiator in order to achieve a significant amount of polymerization. On the other hand, the amount of monovinyl aromatic monomer in the interpolymer should not be too high because the terpolymer tends to become incompatible with co-reactants and with solvents and may be difficult to incorporate uniformly into subsequent solutions and reaction products. Thus, to ensure compatibility with co-reactants and solvents and to provide a controlled degree of reactivity, the interpolymer should advantageously contain about 40 to about 85 parts by weight of monovinyl aromatic units, and from about 15 to about 60 parts by weight of allylic alcohol and allylic ester units, the mol ratio of monovinyl aromatic units to allylic alcohol and allylic ester units being 3:1 or less and more preferably it should comprise from about 50 to about 82 parts by weight of monovinyl aromatic units and from about 18 to about 50 parts by weight of allylic alcohol and allylic ester units, the mol ratio of monovinyl aromatic units to allylic alcohol and allylic ester units being about 2.5 or less.

While the low molecular weight interpolymer may comprise only monovinyl aromatic monomer units and allylic alcohol monomer units the incorporation of allylic ester units in the low molecular weight interpolymer provides lower viscosity to coating dispersions and superior humidity resistance and solvent hold-out to the dielectric or electrically insulating layers of electrographic recording materials prepared from the coating dispersions. Advantageously the mol ratio of allylic ester units to allylic alcohol units in the low molecular weight interpolymer is in the range of about 0.1 to about 10 and is preferably in the range of about 0.2 to about 4. Selection of an appropriate mol ratio is guided by the additional requirement that the glass transition temperature of the interpolymer should be at least about 30° C. and preferably above about 40° C. The glass transition temperature is conveniently determined by differential scanning calorimetry by means of the DuPont Differential Scanning Calorimeter Model No. 900, with a 0.1 to 0.3 g sample of interpolymer heated at a rate of 20° C. per minute in a nitrogen atmosphere. The midpoint of the glass transition is considered to be the glass transition temperature.

A convenient method of preparing the low molecular weight interpolymers comprising monovinyl aromatic monomer, allylic alcohol and allylic ester involves the preparation of a low molecular weight interpolymer of allylic alcohol and monovinyl aromatic monomer. Residual monomer is removed by distillation under reduced pressure and interpolyer is esterified with the monocarboxylic acid or transesterified with an ester of the acid and a lower alcohol, to provide an interpolymer with the desired molecular weight and the desired ratio of allylic alcohol, allylic ester and monovinyl aromatic monomer. The interpolymer of monovinyl aromatic monomer and allylic alcohol is of such a molecular weight that upon esterification, it yields an interpolymer of molecular weight in the range of about 700 to about 5000 and more preferably from about 900 to about 1800. It is understood that the interpolymer may comprise fractions of esterified and unesterified interpolymer of vinyl aromatic monomer and allylic alcohol and that the term, low-molecular weight interpolymer, encompasses blends of unesterified interpolymers, esterified interpolymers, and unesterified and esterified interpolymers, meeting the limitations of molecular weight and interpolymer composition set forth hereinabove.

The high molecular weight interpolymer used in minor proportion in combination with the low molecular weight interpolymer is advantageously of number average molecular weight in the range of about 5,000 to about 200,000. It is generally selected from the group of interpolymers used as binders for the dielectric or electrically insulating layer of electrographic record materials, including polyvinyl acetals, vinyl acetate interpolymers, and styrene-interpolymers.

The polyvinyl acetals useful as the high molecular weight interpolymer component are interpolymers of a $C_5$ to $C_9$ vinyl acetal, a $C_3$ to $C_{10}$ vinyl carboxylate and vinyl alcohol wherein the vinyl carboxylate comprises less than about 30 weight percent of the interpolymer and the vinyl alcohol comprises from about 5 to about 21 weight percent. The preferred vinyl acetal is vinyl butyral and the preferred vinyl carboxylate is vinyl acetate. Preferably the vinyl alcohol content of the interpolymer is in the range of about 9 to about 18 weight percent.

Vinyl acetate interpolymers useful as the high molecular weight interpolymer component include interpolymers comprising from about 60 to about 90 parts by weight vinyl acetate, from about 9 to about 30 parts by weight of a monomer selected from the group consisting of alkyl acrylates containing from 4 to 7 carbon atoms, dialkyl maleates and fumarates containing from 6 to 12 carbon atoms, and vinyl esters of monocarboxylic acids containing from 5 to 20 carbon atoms, and from about 1 to 10 parts by weight of an unsaturated carboxylic acid monomer selected from the group consisting of acrylic acid, methacrylic acid, crotonic acid and monoalkyl maleates and fumarates containing from 5 to 8 carbon atoms. Particularly preferred interpolymers comprise from about 60 to about 90 parts by weight of vinyl acetate, from about 0 to about 30 parts by weight of a dialkyl maleate containing from 6 to 12 carbon atoms and from about 1 to about 10 parts by weight of acrylic acid.

Useful styrene interpolymers include those comprising from about 30 to about 75 parts by weight of styrene, from about 69 to about 15 parts by weight of a monomer selected from the group consisting of alkyl acrylates and methacrylates containing from 4 to 15 carbon atoms and dialkyl maleates and fumarates containing from 6 to 28 carbon atoms and from about 1 to about 10 parts by weight of an unsaturated carboxylic acid monomer selected from the group consisting of acrylic acid, methacrylic acid, crotonic acid and monoalkyl maleates and fumarates containing from 5 to 8 carbon atoms. Particularly preferred interpolymers comprise about 30 to about 70 parts by weight of styrene, from about 69 to about 20 parts by weight of an alkyl acrylate containing from 5 to 11 carbon atoms and from about 1 to about 10 parts by weight of acrylic acid.

The weight ratio of low molecular weight interpolymer to high molecular weight interpolymer ranges from about 99:1 to about 70:30. The low molecular weight interpolymer is used in major proportion to provide coating dispersions of high solids content and low viscosity. The minor proportion of high molecular weight interpolymer can improve the rheology of the coating dispersion, can reduce the tendency of the dispersion to be absorbed when it is coated onto conductive sheet support, can improve the adhesion of the coating to the conductive sheet support and reduce delamination of the electrographic sheet material comprising the electroconductive sheet support and the coating when the electrographic sheet material is subjected to wrinkling and can improve the print density of prints prepared from the electrographic sheet material. Preferably the weight ratio of low molecular weight interpolymer to high molecular weight interpolymer is in the range of about 98:2 to about 90:10.

The inclusion of a small amount of plasticizer or a low molecular weight polystyrene or poly (α-methylstyrene) in the coating composition can be helpful to prevent curling of the electrographic recording material prepared from the coating composition. The amount of such additive is generally not more than about 25 weight percent of the total weight of polymeric binder and plasticizer.

The coating composition is applied to the electrically conductive sheet support as an organic solvent solution containing dispersed therein an inert, non-photoconductive pigment. Appropriate solvents include the lower alcohols, ketones, esters and aromatic hydrocarbons and blends thereof and blends containing these solvents and the lower aliphatic and alicyclic hydrocarbons. Interpolymers containing high ratios of polar or hydrogen bonding groups such as alcohol groups may require some polar solvent to provide solubility in aromatic hydrocarbons. The non-photoconductive pigment may be organic or inorganic including pigments such as silica, calcined clay, zinc oxide, zinc sulfide, titanium dioxide, talc, calcium carbonate, diatomaceous earth, barium sulfate and lithopone. The mean particle size of the pigment, defined as the size at which 50 weight percent of the pigment is coarser and 50 weight percent is finer, is preferably less than about 10 micron and is more preferably less about 5 micron. Especially preferred pigments are fine wet-ground calcium carbonates of mean particle size in the range of about 0.5 to about 5 microns, such as the calcium carbonate pigment sold by Thompson, Weinman and Company under the tradename Atomite. The amount of pigment is generally in the range of about 200 to about 1000 parts by weight per 100 parts by weight of polymeric binder and is preferably in the range of about 250 to about 500 parts per 100 parts. The solids content of the dispersion is advantageously in the range of about 250 to about 500 parts per 100 parts. The solids content of the dispersion is advantageously in the range of about 40 to about 90 weight percent and is preferably in the range of about 50 to about 80 weight percent.

The amount or dry weight of coating composition applied to the sheet support should be sufficient to provide a uniform coating substantially free of defects which might impair the quality of the image reproduced on the insulating layer. The amount can be in the range of about 2 to about 20 g dry weight per sq. m. of recording material, preferably from about 4 to about 12 g. per sq. m. However, smaller amounts may suffice if a sufficient electrostatic charge can be applied without the risk of breakdown.

In general, paper is used as support for the insulating layer, although other supports such as metal foils or sheets, textile materials, and plastic films such as films of cellulose triacetate or of polyester e.g. of polyethylene terephthalate can also be used. In comparison to the insulating layer, the support must have a much higher electric conductance as will be described more clearly hereinafter.

The electroconductivity of normal paper is rather low, especially when it has been coated with a covering layer of an insulating binder such as the polymeric binder of the present invention. Therefore, the electroconductivity of the paper should be enhanced to obtain an appropriate electrographic recording material. This can be accomplished e.g. by the addition of salts such as potassium nitrate and/or conductive polymers to the wood pulp during the paper making. A favorable electroconductivity of the paper can also be obtained by impregnating the paper already formed with solutions of salts and/or conductive polymers. Good results are obtained also with paper carrying on at least one side a conductive layer serving as an intermediate layer between the support and the insulating layer. This conductive layer may be composed of e.g. conductive polymers. Surface resistivity values in the range of about $1 \times 10^7$ to $1 \times 10^{10}$ ohm/sq. for the support allow a normal charging of the insulating surface. Indeed, it should be taken into account, that the surface resistivity values of the insulating layer, when measured in the same way, are normally much higher and will show values of $1 \times 10^{11}$ to $1 \times 10^{14}$ ohm/sq. or even more.

What has been said above concerning the improvement of the conductivity of paper by the application thereto of conductive polymers also applies to other supports. By the application of conductive polymers to at least one side of these supports a satisfactory electroconductivity can also be obtained. Of course, it may sometimes be necessary, for example, when highly hydrophobic films are used as supports e.g. films of polyethylene terephthalate, to provide these film supports first with a known subbling layer or combination of layers to secure a sufficient adhesion of the layers coated thereon.

The electrographic recording materials prepared from the coating compositions can be used in an electrostatic printing apparatus wherein an electrostatic charge pattern is built up on the insulating layer by conventional means such as by moving the material in close contact with electroconductive styli or by transferring an electrostatic charge pattern from a photoconductive drum. The electrostatic latent charge pattern formed on the insulating layer can be developed according to techniques known in the art, e.g. by means of a two-component developer composed of a toner and a carrier material or by liquid electrophoretic development. The developed pattern is then made permanent or fixed by application of heat or pressure to fuse the toner to the insulating layer.

The invention is further described and illustrated in the following examples which should not be construed as limiting its scope. All parts and percentages are by weight unless otherwise indicated.

EXAMPLE 1

A uniform dispersion of a wet-ground calcium carbonate pigment sold by Thompson, Weinman and Company under the tradename Atomite, an interpolymer of styrene, allyl alcohol and allyl benzoate and a polyvinyl butyral is prepared by adding the pigment incrementally to a solution of the styrene interpolymer and polyvinyl butyral in toluene while the solution is stirred slowly in a blender and when all the pigment has been added, subjecting the mixture to high speed blending for 2 minutes. The styrene interpolymer comprises 60.4 weight percent styrene, 11.3 weight percent allyl alcohol, and 28.3 weight percent allyl benzoate. Its number average molecular weight is 1430 and its glass transition temperature is 45° C. The polyvinyl butyral is characterized by a vinyl acetate content of 1.5 weight percent, a hydroxyl content of 11 weight percent and a number average molecular weight of about 20,000 and is sold by Monsanto under the registered Trademark Butvar B 76. The solids content of the dispersion is 65 weight percent, the pigment content is 48.7 weight percent, and the polymeric binder content is 16.3 weight percent. The weight ratio of styrene interpolymer to polyvinyl butyral is 50:1. The dispersion viscosity measured on a Brookfield viscometer, with the no. 3 spindle at 100 rpm is 66 cps.

An electroconductive base paper supplied by Crown Zellerbach Co. and identified as narrow range PF-496 is coated on the wire side by means of a Meyer number 5 wire wound rod with the calcium carbonate dispersion to provide a dry coating weight of 9.9 g/sq.m. The coated paper is allowed to dry and is stored for 16 hours at 22° C. and 50 percent relative humidity. It is then printed at 50 percent relative humidity in a 900A Versatec printer using the MTE-15 Test Exerciser. The print density determined with the Welch Scientific Company's Densichron Instrument using the black filter and standardized against the Reflection Standard No. 2 at a density of 0.505 is 0.82. When a sample of the coated paper is creased and wrinkled, no separation of the interpolymer coating from the base paper occurs.

EXAMPLE 2

A dispersion of calcium carbonate in a solution of polymeric binder is prepared by the method of example 1, with the styrene interpolymer and the polyvinyl butyral of example 1 in the weight ratio of 95:5. The solids content of the dispersion is 65 weight percent. The dispersion viscosity is 78 cps. The pigment to binder ratio is 3:1.

A coated paper is prepared by applying the dispersion to the paper support of example 1 with a Meyer number 4 wire wound rod to provide a coating weight of 9.1 g/sq.m. A Versatec print, obtained from the coated paper, has a print density of 0.90.

EXAMPLE 3

A dispersion of calcium carbonate in a solution of polymeric binder is prepared by the method of example 1, with the styrene interpolymer and the polyvinyl butyral of example 1 in the weight ratio of 9:1. The solids content of the dispersion is 60 weight percent. The pigment to binder ratio is 3:1.

A coated paper is prepared by applying the dispersion to the paper support of example 1 with a Meyer number 6 wire wound rod to provide a coating weight of 9.9 g/sq.m. A Versatec print, obtained from the coated paper, has a print density of 0.91.

EXAMPLE 4

A dispersion of calcium carbonate and polymeric binder is prepared by the method and in the ratio of example 1. The polymeric binder comprises a styrene interpolymer of 67.8 weight percent styrene, 19.5 weight percent allyl alcohol and 12.7 weight percent allyl benzoate, of number average molecular weight 1276 and glass transition temperature 51° C. and the polyvinyl butyral of example 1 in a weight ratio of 50:1. The solids content of the dispersion is 65 weight percent. The dispersion viscosity is 87 cps.

A coated paper is prepared by applying the dispersion to the paper support of example 1 with a Meyer number 5 wire wound rod to provide a coating weight of 9.8 g per sq. meter. A Versatec print, obtained from the coated paper, has a print density of 0.87.

EXAMPLE 5

A dispersion of calcium carbonate and polymeric binder is prepared by the method and in the ratio of example 1. The polymeric binder comprises the styrene interpolymer of example 1 and a vinyl acetate addition polymer comprising vinyl acetate, dibutyl maleate and acrylic acid, of relative viscosity 1.7 determined with an ethyl acetate solution containing 1 g of polymer per dl., sold by Monsanto under the registered tradename Gelva Multipolymer Solution 270T. The weight ratio of styrene interpolymer to vinyl acetate addition polymer is 9:1. The solids content of the dispersion is 65 weight percent. The dispersion viscosity is 64 cps.

A coated paper is prepared by applying the dispersion to the paper support of example 1 with a Meyer number 5 wire wound rod to provide a coating weight of 10.4 g/sq.m. A Versatec print, obtained from the coated paper, has a print density of 0.87.

EXAMPLE 6

A dispersion of calcium carbonate and polymeric binder is prepared by the method and in the ratio of example 1. The polymeric binder comprises the low molecular weight styrene interpolymer of example 1 and a high molecular weight styrene-acrylate interpolymer comprising 74 parts by weight styrene, 25 parts by weight of ethyl acrylate and 1 part by weight of acrylic acid, of relative viscosity 1.6 determined at 25° C. with an ethyl acetate solution of interpolymer at a concentration of 1 g/dl. The weight ratio of low molecular weight polymer to high molecular weight polymer is 9:1. The solids content of the dispersion is 65 weight percent. The dispersion viscosity is 55 cps.

A coated paper is prepared by applying the dispersion to the paper support of example 1 with a Meyer number 5 wire wound rod to provide a coating weight of 10.3 g/sq.m. A Versatec print, on the coated paper has a density of 0.83.

EXAMPLE 7

A dispersion of calcium carbonate is prepared according to example 1 with a toluene solution of a poly-(α-methylstyrene) of number average molecular weight 960 and the polyvinyl butyral of example 1. The weight ratio of poly(α-methylstyrene) to polyvinyl butyral is 50:1. A pasty dispersion forms and can not be coated on the electroconductive base sheet. Addition of ethanol to the dispersion gives no improvement.

What is claimed is:

1. A coating composition comprising an intimate blend of a polymeric binder and from 200 to 1000 parts by weight of a finely divided non-photoconductive pigment per 100 parts by weight of the polymeric binder; wherein the polymeric binder comprises a major proportion of a low molecular weight interpolymer and a minor proportion of a high molecular weight interpolymer; wherein the low molecular weight interpolymer comprises from about 40 to about 85 parts by weight of monovinyl aromatic monomer units and from about 15 to about 60 parts by weight of units of a $C_3$–$C_7$ allylic alcohol and of a $C_3$–$C_7$ allylic alcohol ester of a mono-carboxylic acid, the mol ratio of monovinyl aromatic units to allylic alcohol and allylic ester units being about 3:1 or less, the mol ratio of allylic ester units to allylic alcohol units being in the range of 0 to about 10, the number average molecular weight of the interpolymer being in the range of about 700 to about 5000 and the glass temperature of the interpolymer being at least about 30° C.; wherein the high molecular weight interpolymer has a number average molecular weight in the range of about 5,000 to about 100,000; and wherein the weight ratio of low molecular weight interpolymer to high molecular weight interpolymer is in the range of about 99:1 to about 70:30 and the solids content of the coating composition is in the range of about 40 to about 90 weight percent.

2. The coating composition of claim 1 wherein the low molecular weight interpolymer comprises from about 50 to about 82 parts by weight of monovinyl aromatic units and from about 18 to about 50 parts of allylic alcohol and allylic ester units, the mol ratio of monovinyl aromatic units to allylic alcohol and allylic ester units being about 2.5 or less, and the number average molecular weight being in the range of about 900 to about 1800.

3. The coating composition of claim 1 or 2 wherein the monovinyl aromatic monomer is styrene, the allylic alcohol is allyl alcohol and the allylic ester is allyl benzoate.

4. The coating composition of claim 1 or 2 wherein the finely divided pigment is selected from the group consisting of silica, calcined clay, zinc oxide, zinc sulfide, titanium dioxide, talc, calcium carbonate, diatomaceous earth, barium sulfate and lithopone.

5. The coating composition of claim 1 or 2 wherein the finely divided pigment is wet-ground calcium carbonate of mean particle diameter less than about 10 microns.

6. The coating composition of claim 3 wherein the finely divided pigment is wet-ground calcium carbonate of mean particle diameter in the range of about 0.5 to about 5 microns and the solids content of the coating composition is in the range of about 50 to about 80 weight percent.

7. The coating composition of claim 1 or 2 wherein the high molecular weight interpolymer is selected from the group consisting of polyvinyl acetals, vinyl acetate interpolymers and styrene interpolymers.

8. The coating composition of claim 3 wherein the high molecular weight interpolymer is selected from the group consisting of polyvinyl acetals, vinyl acetate interpolymers and styrene interpolymers.

9. The coating composition of claim 4 wherein the high molecular weight interpolymer is selected from the group consisting of polyvinyl acetals, vinyl acetate interpolymers and styrene interpolymers.

10. The coating composition of claim 6 wherein the high molecular weight interpolymer is selected from the group consisting of polyvinyl acetals, vinyl acetate interpolymers and styrene interpolymers.

11. A coating composition comprising an intimate blend of a polymeric binder and from 200 to 1000 parts by weight of a finely divided, non-photoconductive pigment per 100 parts by weight of the polymeric binder; wherein the polymeric binder comprises a major proportion of a low molecular weight interpolymer and a minor proportion of a high molecular weight interpolymer; wherein the low molecular weight interpolymer comprises from about 40 to about 85 parts by weight of monovinyl aromatic monomer units and from about 15 to about 60 parts by weight of units of a $C_3$–$C_7$ allylic alcohol and of a $C_3$–$C_7$ allylic alcohol ester of a monocarboxylic acid, the mol ratio of monovinyl aromatic units to allylic alcohol and allylic ester units being about 3:1 or less, the mol ratio of allylic ester units to allylic alcohol units being in the range of 0.1 to about 10, the number average molecular weight of the interpolymer being in the range of about 700 to about 5000 and the glass temperature of the interpolymer being at least about 30° C.; wherein the high molecular weight interpolymer has a number average molecular weight in the range of about 5,000 to about 100,000; and wherein the weight ratio of low molecular weight interpolymer to high molecular weight interpolymer is in the range of about 99:1 to about 70:30 and the solids content of the coating composition is in the range of about 40 to about 90 weight percent.

12. The coating composition of claim 11 wherein the allylic ester units of the interpolymer are present in a ratio of about 0.2 to about 4 allylic ester units per allylic alcohol unit, wherein the weight ratio of low molecular weight interpolymer to high molecular weight interpolymer is in the range of about 98:2 to about 90:10, and wherein the finely divided non-photoconductive pigment is selected from the group consisting of silica, calcined clay, zinc oxide, zinc sulfide, titanium dioxide, talc, calcium carbonate, diatomaceous earth, barium sulfate and lithopone.

13. The coating composition of claim 12 or 11 wherein the monovinyl aromatic monomer is styrene, the allylic alcohol is allyl alcohol and the allylic ester is allyl benzoate.

14. The coating composition of claim 13 wherein the finely divided pigment is wet-ground calcium carbonate of mean particle diameter in the range of about 0.5 to about 5 microns.

15. The coating composition of claim 14 wherein the high molecular weight interpolymer is selected from the group consisting of polyvinyl acetals, vinyl acetate interpolymers and styrene interpolymers.

* * * * *